United States Patent [19]

Schmitt

[11] 4,116,472
[45] Sep. 26, 1978

[54] SEALED WALL LEAD-THROUGH MEANS FOR CABLES IN PARTICULAR FOR JUNCTION BOXES

[76] Inventor: Ludwig Peter Schmitt, 67260 Sarre-Union, France

[21] Appl. No.: 571,018

[22] Filed: Apr. 22, 1975

[30] Foreign Application Priority Data

Apr. 25, 1974 [FR] France .................. 74 14476
Apr. 15, 1975 [FR] France .................. 75 11670

[51] Int. Cl.² .............................................. F16L 35/00
[52] U.S. Cl. ................................... 285/4; 174/65 R;
285/161; 285/320; 285/330
[58] Field of Search ............... 285/161, 189, 205, 322,
285/323, 330, 320, 128, 3, 4; 174/65 R, 65 SS;
16/2; 248/56

[56] References Cited

U.S. PATENT DOCUMENTS 1,726,808 9/1929 Cox ..................... 285/323
2,819,099 1/1958 Rittle ................... 285/323 X

FOREIGN PATENT DOCUMENTS 1,375,634 9/1964 France ................. 174/65 R
1,602,183 11/1970 France ................. 285/161
930,478 7/1963 United Kingdom ..... 174/65 R Primary Examiner—Dave W. Arola

[57] ABSTRACT

A fluid-tight wall lead-through device for cables or the like comprising a bushing forming a packing-box and gland assembly for tightly enclosing a said cable in sealing relationship, said bushing extending through a hole of said wall and being secured within said hole by means of a clamping member; wherein the improvement consists in that said bushing of said device is provided with end teeth forming levers, one end of which is bearing onto the wall and the other end tightly encloses a deformable sealing packing which is adapted to be deformed by said teeth upon a pivotal motion thereof, through a lever action against said wall, when said clamping member is tightened.

7 Claims, 9 Drawing Figures

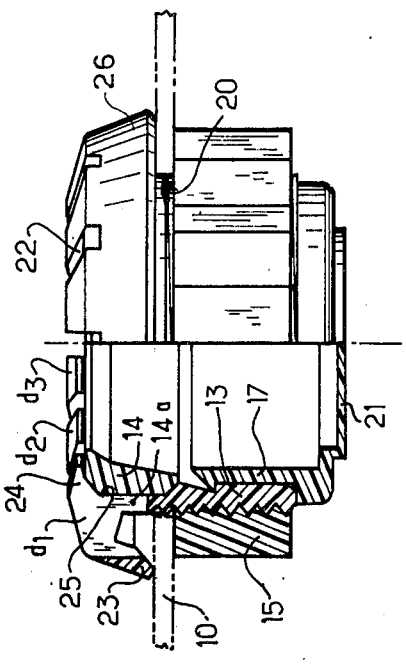
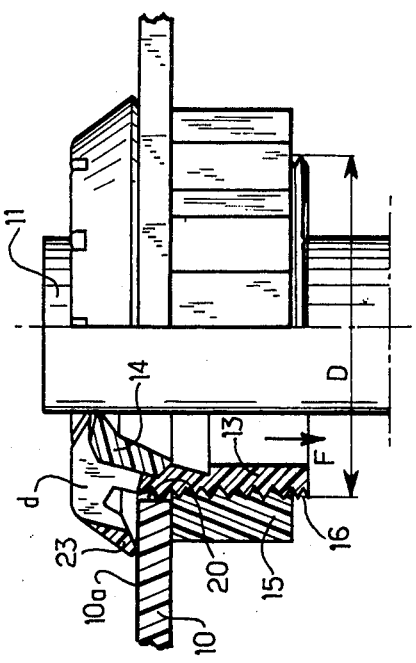
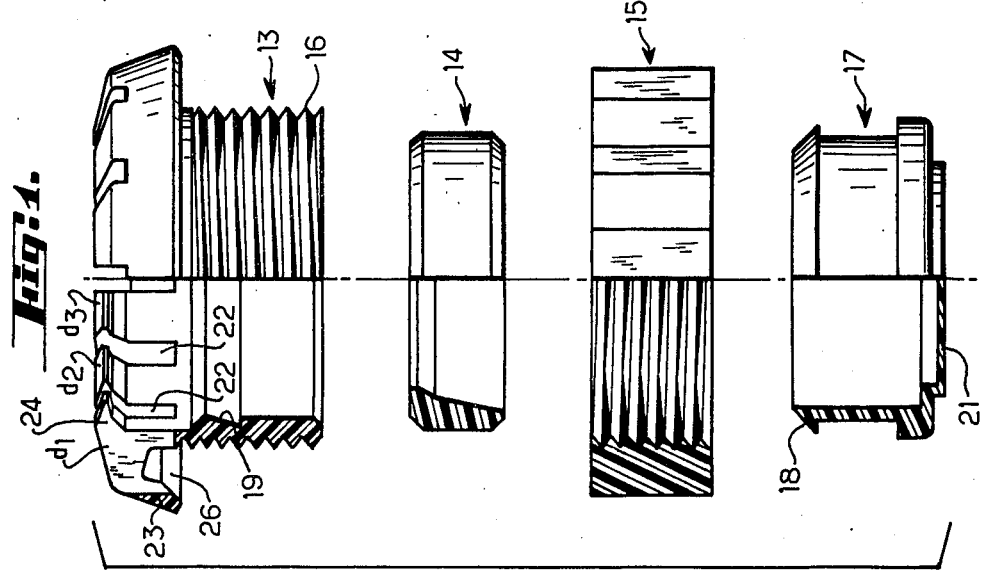

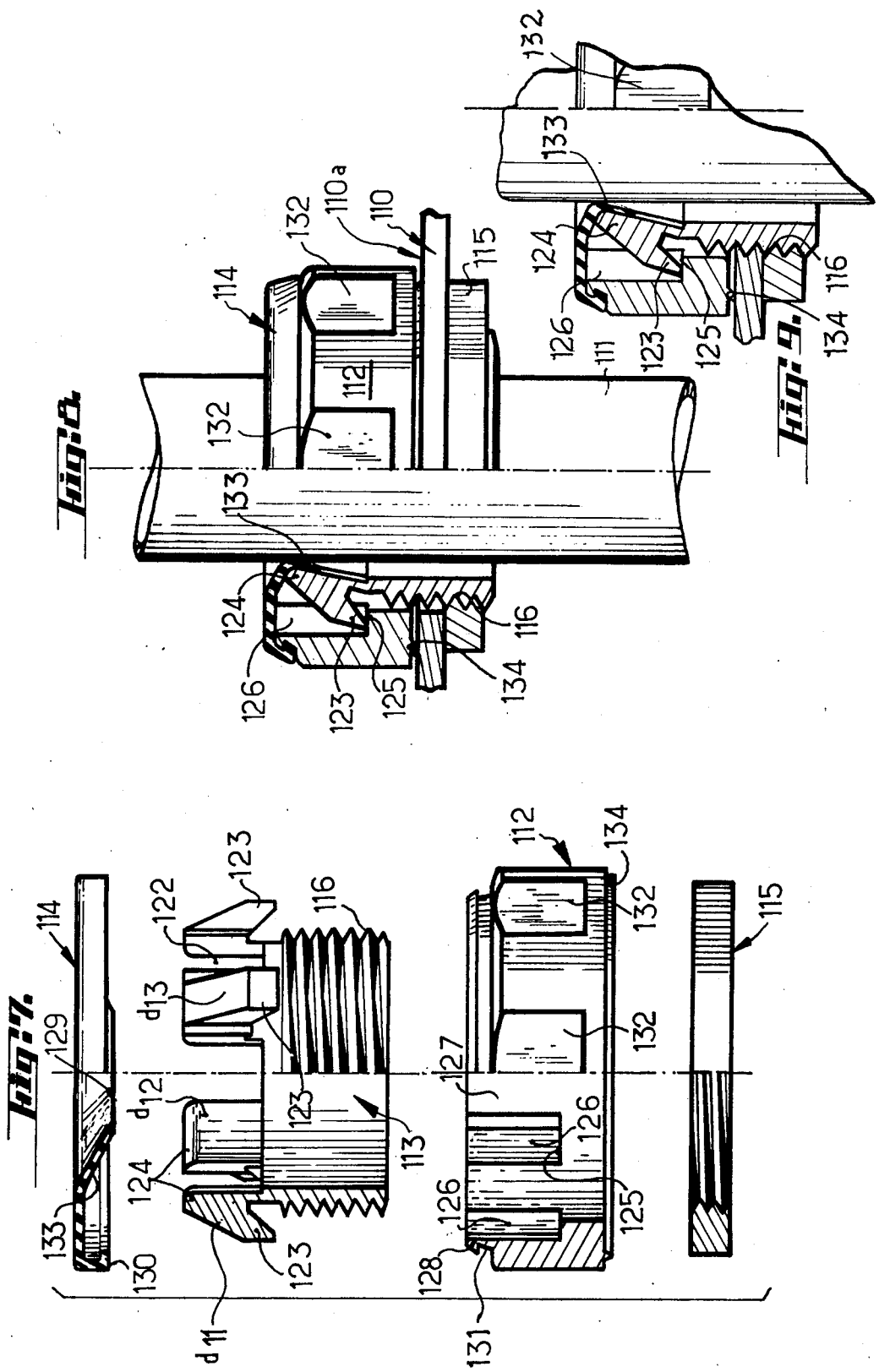

SEALED WALL LEAD-THROUGH MEANS FOR CABLES IN PARTICULAR FOR JUNCTION BOXES

The present invention relates essentially to a fluid-tight or sealed wall lead-through device forming a bushing, socket or like duct means for cables, conducting lines or like wires and in particular for the connections of electric cables in junction, branch, connection, distribution, terminal boxes or the like. The fluid-tight lead-through device according to the invention is of a known type making use of a sleeve forming a stuffing or packing and gland box assembly adapted to tightly enclose or clamp the cable in sealing relationship, said sleeve or like duct or socket extending through a hole formed within the wall and caused to be applied or bear with a thrust or abutment collar against a first side face of the wall while being secured within the hole by means of a clamping member or fastening means such as a nut screwed onto a threading of the sleeve and which is caused to be applied after having been tightened against the other side face of the wall.

A known device of this kind forming a stuffing box or like packing box and gland has been disclosed for instance in the French Pat. No. 1,602,183 applied for on Dec. 30, 1968 by the same applicant under the title "Device forming a packing gland for electric cables."

No known device of this type has however proved to be fully satisfactory in particular with respect to the cost price and swiftness of use or of operation. In particular the number of component parts which make up the known device of this kind, their arrangement and their mounting onto the wall require too great a number of operating steps thereby making the manufacture expensive and complicating the use of these devices.

According to the invention the above-mentioned difficulties are avoided by providing a fluid-tight wall lead-through device for cables, conducting lines, wires or the like and in particular for the connection of electric cables within junction boxes, of the kind making use of a sleeve, bushing, socket or like duct means forming a packing gland or stuffing-box adapted to tightly enclose or clamp the cable in sealing relationship said bushing or sleeve extending through a hole provided in said wall while bearing with a thrust collar or like ring-shaped abutment means against a first side face of the wall while being secured within said hole by means of a clamping member such as a nut screwed onto a threading of said sleeve or bushing and which is caused to be applied after tightening thereof against the other side face of the wall, said device being characterized according to the invention in that said bushing or sleeve is formed with end teeth or like serrations forming levers one end of which is bearing on said first side face of the wall outside of the hole diameter whereas the other end tightly encloses a deformable sealing packing, said packing and said teeth having complementary or mating shapes to provide for the deformation of the packing through said teeth upon a pivoting motion of said teeth through a lever action against said first side face resulting from the action of a tightening of said clamping member. Thus with a device according to the invention it is only required for running a cable in tight or sealed relationship through a wall to thread the cable through the sleeve or bushing and then to position the sleeve or bushing within the hole of the wall while merely tightening the locking or clamping member thereby providing simultaneously for the fastening of the sleeve or bushing within the hole of the wall and the tight clamping of the sealing packing against the cable to achieve the fluid-tightness for the cable extending or running through the wall.

The invention will be better understood and further objects, characterizing features, details and advantages thereof will appear more clearly as the following explanatory description proceeds with reference to the accompanying diagrammatic drawings given by way of non-limitative examples only illustrating several presently preferred specific forms of embodiment of the invention and wherein:

FIG. 1 is an exploded view, one half being in cross-section and the other half being an outside view, showing the various component elements making up a wall lead-through device according to the invention;

FIG. 2 is a view one half of which is in cross-section and the other half being an outside view, showing the various elements illustrated in FIG. 1 in assembled positions;

FIGS. 3 and 4 are a sectional half-view and an outside half-view showing the device according to the invention as applied to running two lines of very different diameters in tight or sealed relationship through a wall;

FIG. 7 is an exploded view one half of which is in section and the other half being an outside view illustrating the various component elements or parts making up another kind of fluid-tight wall lead-through device according to the invention;

FIG. 8 shows a sectional half-view and an outside half-view illustrating the device of FIG. 7 as applied to leading an electric line or cable in fluid-tight or sealing relationship through a wall;

FIG. 9 shows a partial view similar to FIG. 8 of a threaded hole and collar.

Figure 4:
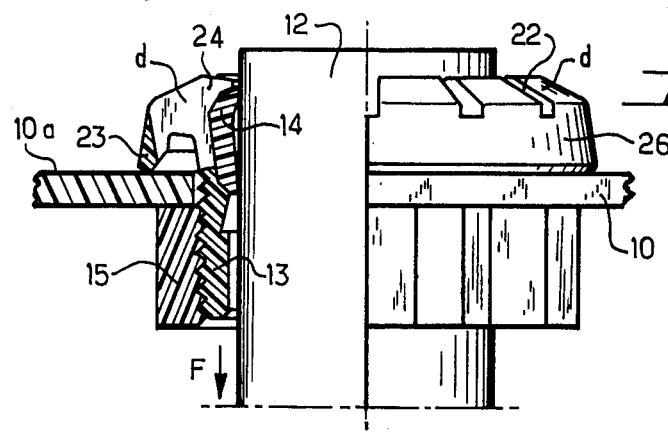

According to the form of embodiment shown the fluid-tight lead-through device 10 for a cable 11 (FIG. 3) or 12 (FIG. 4) essentially comprises a bushing 13, a sealing packing 14 and a clamping or locking member such as a nut 15 adapted to be screwed onto a thread 16 of the bushing 13. Moreover a closing plug or stopper 17 which is formed with a hook-shaped flange or ledge 18 may be secured through mere insertion into the bushing 13 by engagement of the flange or ledge 18 into an annular groove 19 provided on the inner wall of the bushing so as to achieve in particular the fluid-tight closing of the hole 20 provided in the wall 10 (FIG. 2) when the device is not used as a passageway socket or duct for a cable. Moreover as known per se when the bottom 21 of the plug 17 is thin and flexible or yielding enough it may be used for providing a fluid-tight lead-through for a cable of small diameter or for improving the fluid-tightness if it is left in position and a line which will be normally clamped by the sealing packing 14 is extending therethrough.

According to the invention the bushing 13 terminates at one of its axial ends in teeth $d$ such as $d_1$, $d_2$, $d_3$, etc. which are separated or spaced from each other by narrow gaps or intervals 22 and which project outwards beyond the diameter D of the hole provided in the wall 10. Each tooth forms a lever one end 23 of which is bearing (FIGS. 3 to 6) against a first side face 10a of the wall 10 whereas the other end 24 tightly encloses the sealing packing 14. More specifically the teeth and the packing are so shaped that the teeth form an annular cup-like cradle or seating 25 into which is engaged and fitted or set the corresponding lateral outside face 14a of the packing. In the form of embodiment shown the sealing packing has the shape of a ring with an elongated cross-sectional contour having approximately the height of the teeth d.

Furthermore it should be noted that in order to impart a good mechanical strength to the bushing 13 and provide for a good co-operation of the various teeth with each other the latter are connected at their ends 23 by a continuous annular collar 26. The operation of the device described may be easily inferred from the foregoing description.

Figure 5:
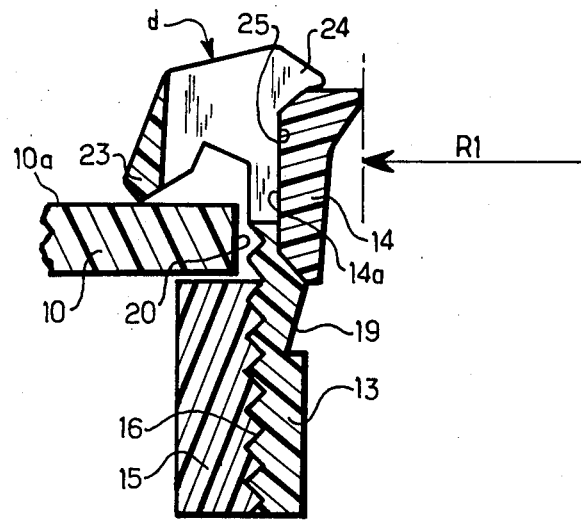
FIGS. 5 and 6 show diagrammatically in section on a larger scale how the teeth of the sleeve or bushing and the sealing packing co-operate with each other for achieving the results aimed at by the invention.
Figure 6:
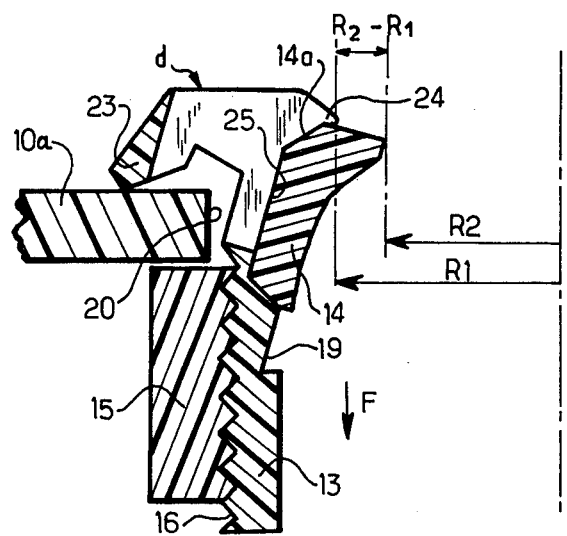

After having assembled the sealing packing 14 into its cradle or seating 25 provided by the inner walls of the teeth d it is only necessary to insert the conducting line such as 11 or 12 into the bushing 13 and the packing 14 positioned thereon and then to thread the threaded portion 16 of the bushing into the hole 20 of the wall 10. Thereafter it is only necessary to screw the nut 15. The tightening of the nut onto the bushing results in a pull exerted in the direction of the arrow F onto the bushing 13 which is abutting with the ends 23 of the teeth d against the wall 10. The teeth will then pivot or rotate (see FIGS. 5 and 6) generating a lever action and squeezing or compressing with their other ends 24 the packing 14 trapped within the cradle 25 thereby producing a radial compression of the packing 14 as illustrated in FIGS. 5 and 6 wherein has been shown in particular a reduction of the radius of line passageway through the packing 14 from the radius $R_1$ to the radius $R_2$.

Taking into account the flexibility of the bushing which may advantageously be moulded in any suitable plastics material a single device for leading in fluid-tight or sealed relationship through a hole 20 previously formed in a wall will of course adapt itself to the passage of various kinds of cables or lines of different diameters. Each time it will only be necessary by tightening or untightening more or less the nut 15 to apply the sealing packing 14 with the required sealing pressure against the cable or line used.

Several detail modifications may be resorted to. Thus for instance the nut 15 may be dispensed with or omitted if there is provided a corresponding threading in the wall 10 led through into which will be screwed the threading 16 of the bushing. Also the closing plug 17 may before use be replaced by a thin diaphragm integral or made fast either with the nut or with the bushing and which it is only necessary to cut out, punch, drill or bore prior to the use thereof.

The device shown in FIGS. 7 and 8 is characterized in particular by the shape of the sealing packing which is able to undergo larger deformations and by the manner according to which the teeth of said bushing are able to bend upon bearing inside of an outer annular collar the function of which will be described hereinafter.

According to the form of embodiment shown the fluid-tight wall lead-through device 110 for a cable 111 mainly comprises a bushing 113, a sealing packing 114, an external annular substantially cylindrical collar 112 and a nut 115. The bushing 113 is formed with an outer threaded portion 116 and terminates at one of its axial ends in teeth $d_{11}$, $d_{12}$, $d_{13}$, etc., separated or spaced from each other by gaps 122. Each tooth forms a lever one end 123 of which is bearing (FIG. 8) onto a first side face 110a of the wall 110 through the medium of the collar 112 owing to a corresponding abutment 125 consisting of one end of a longitudinal cut 126 provided on the inner surface 127 of the collar 112. Each end 123 is thus inserted into a corresponding cut 126 so that all of said ends and said cuts form the co-operating locking means for holding said bushing against rotation with respect to said outer annular collar. The sealing packing 114 consists of a relatively flat resilient annular diaphragm adapted to be stretched between all of the ends 124 of the teeth and a circular ridge or flange 128 of the collar 112. More specifically the outer edge 130 of the sealing packing 114 is turned or bent down so as to conform to the profile of the ridge or flange 128 whereas the most central zone of the diaphragm consists of a flared tapered or conical portion 133 (truncated for providing a passageway/ hole 129 for the cable or tube 111) engageable with the inner portions of the ends 124. Moreover before use the hole 129 is not compulsorily provided so that the packing 114 may serve as a closing diaphragm. In such a case the fluid-tight solid packing comprises in the middle thereof a hollow impressed mark for a cutting operation defining the edge of the hole 129 which may thus be provided at proper time without the assistance of any tool. In addition it should be noted that the outer edge 130 of the packing 114 has a hook-shaped configuration engageable with a circular groove 131 adjacent to said ridge or flange 128. It may also be noted that the outer side surface of the collar 112 is provided with six flat parts 132 enabling to carry out the mounting of the component elements of the device on the side of the face 110a if need be. The fluid-tight or sealing relationship between the device and the wall is provided by a thin ring portion 134 of the collar 112 which may be resiliently deformed for taking up possible irregularities of the surface of the wall 110. Finally the nut 115 may of course be dispensed with or omitted if there is provided a threading in this wall 110. The mounting of the device described is the following:

After having inserted the bushing 113 into the collar 112 while the ends or tips 123 of the teeth d are bearing against the shoulders 125 the packing 114 is positioned between the ends 124 and the ridge or flange 128. It is then only necessary to pass the cable 111 into the bushing 113 and to tighten the nut 115 until the flared tapered or conical portion 133 of the packing is applied in fluid-tight or sealing relationship against the outside surface of the cable 111. Under the clamping action indeed the teeth are caused to pivot inwards of the bushing while stretching or drawing the resilient packing 114. The shape of the packing 114 allows very large deformations thereof and accordingly the passing of cables with very different diameters. Moreover it may be noted that during the tightening step the ends 123 which are inserted deeply down to the bottoms of the cuts 126 may not slide or slip radially outwards owing to the presence of the collar 112 thereby substantially the increasing the effectiveness of the lever action of the teeth the inward rocking or tilting thereof is enhanced.

It should be understood that the invention is not at all limited to the forms of embodiment which have just been described and which have been given by way of example only. It comprises all the technical equivalents of the means described if they are used within the scope of the appended claims.

What is claimed is:

1. In a fluid-tight wall lead-through packing and gland assembly for cables more particularly for the connection of electric cables within a hole in a wall of a junction box, comprising a bushing having a threaded portion securable within said hole and advanceable axially therewithin, said bushing terminating at one of its axial ends in circumferentially spaced and axially extending teeth radially tiltable with respect to said threaded portion, each of said teeth forming a lever one free end of which projects radially outwardly of the surface of said bushing, an annular collar adapted to axially abut the wall and positionable coaxially and externally of and about said one axial end of said bushing and comprising circumferentially spaced longitudinal cuts provided on a portion of the inner surface of said collar, said cuts being positioned and dimensioned to receive corresponding teeth of said bushing, one end of each said cut forming an abutment for bearing engagement by the free end of the corresponding tooth of said bushing, and an annular deformable sealing packing positionable concentrically about said cable and having a medial portion entering said one axial end of said bushing and a radially outer portion engaging with said annular collar; thereby said teeth are radially inwardly pivotable upon engagement of said teeth with said abutment and engagement of said collar with the wall in response to axial advancement of said bushing into the hole so as to deform said sealing packing into sealing engagement with the outer surface of the cable.

2. A packing and gland assembly according to claim 1, wherein said hole is internally threaded and wherein flat parts are provided on outer side surfaces of said annular collar enabling mounting of the collar on one side of the wall.

3. A device according to claim 1, wherein said sealing packing comprises a resilient diaphragm the most central zone thereof consists of a flared conical or tapered portion.

4. A device according to claim 1, wherein said sealing packing comprises a fluid-tight and solid resilient diaphragm structure prior to use and has in the middle thereof a hollow impression mark for cutting purposes defining the edge of a hole.

5. A device according to claim 4, wherein said resilient diaphragm comprises a flared tapered or conical portion.

6. A packing and gland assembly according to claim 1, including a clamping member cooperable with said threaded bushing to effect axial advancement thereof.

7. A packing and gland assembly according to claim 6, wherein said clamping member is a nut threadable onto said bushing at the axial end thereof opposed from said one axial end.

* * * * *